S. G. Lewis,
Paste Board.
No. 4300. Reissued Mar. 14. 1871.
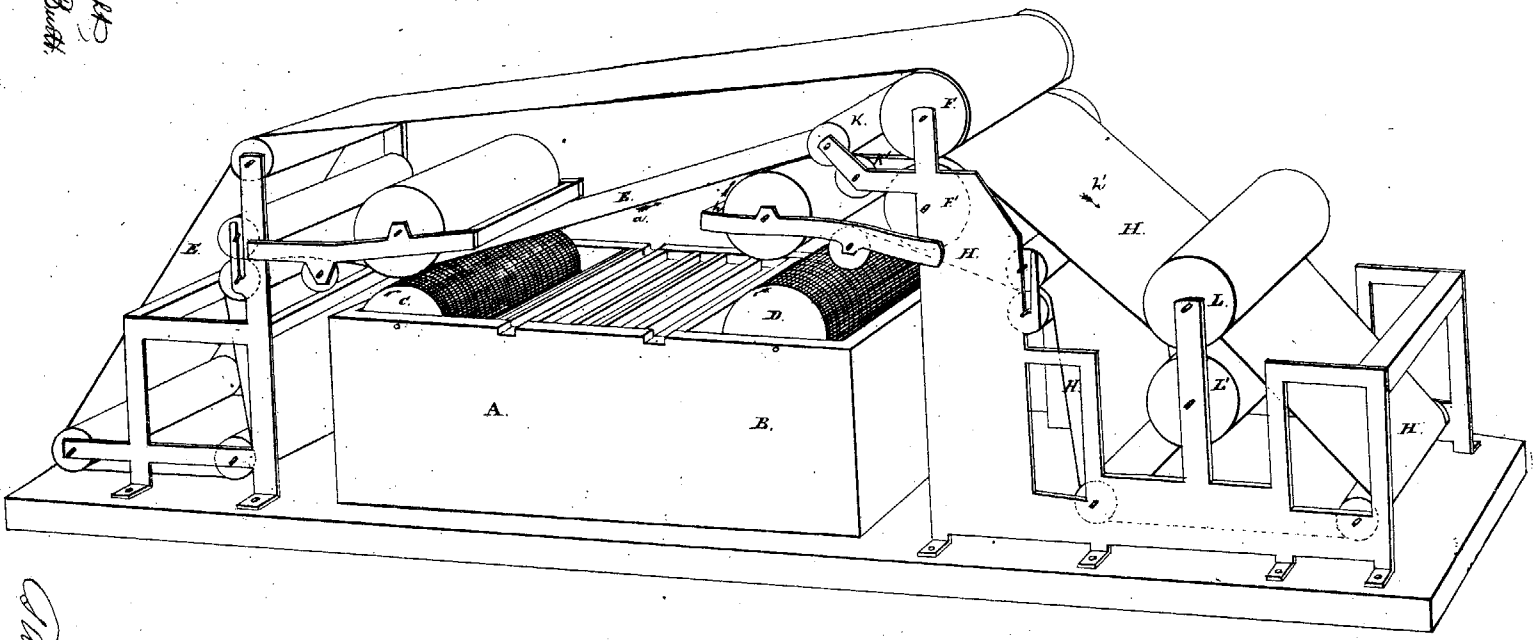
Witnesses { Rom. R. Wright
Thos. A. Butt.
Inventor
Samuel G. Lewis
N. PETERS, PHOTO-LITHOGRAPHER, WASHINGTON, D. C.

UNITED STATES PATENT OFFICE

SAMUEL G. LEVIS, OF KELLYSVILLE, PENNSYLVANIA, ASSIGNOR TO JAMES C. BEACH.

IMPROVEMENT IN MAKING THICK PAPER.

Specification forming part of Letters Patent No. 10,519, dated February 14, 1854; reissue No. 2,789, dated October 22, 1867; extended seven years; reissue No. 4,300, dated March 14, 1871.

*To all whom it may concern:*

Be it known that I, SAMUEL G. LEVIS, of Kellysville, in the county of Delaware and State of Pennsylvania, have invented a new and useful Improvement in Making Thick Paper; and I do hereby declare that the following is a full, clear, and exact description of the same, reference being had to the annexed drawing, which represents a perspective view of my improvement.

In the ordinary manufacture of paper the paper is made in a continuous sheet, of a single uniform thickness, in the following manner: A cylinder of fine wire-cloth rotates, partially immersed in a vat of prepared pulp. This cylinder rotates in contact above with an endless felt passing around a roller, and onto the felt the paper is formed by the rotating cylinder of wire-cloth pressing the pulp which it has taken up from the vat. The paper thus formed is carried up on the endless felt between two metallic squeeze-rollers, and the water partially squeezed out. The paper then leaves the felt, and is passed between a second pair of squeeze-rollers, and then around a series of calenders or drying-rollers. This is the ordinary method of making paper by cylinder-machines, and the paper so made is of one thickness and uniform texture throughout. The thickness which can be given to paper so made, consistently with the preservation of strength and uniformity of strength, is limited, for the meshes of the wire-cloth cylinder can only screen a given quantity of water through, and if the thickness of the layer of pulp be increased beyond a certain extent, the paper would be soft and be crushed between the squeeze-rollers. Thus its texture would be weakened, and the uniformity of its appearance would be destroyed.

It has been long desirable, in the art of paper-making, to form paper of considerable thickness of perfect texture, and of strength proportioned to such increased thickness. To attain this object several attempts have been made. Thus, the paper, after being formed on the felt and passed through the two pairs of squeeze-rollers, has been wound around a reel before passing over the heated calenders. The undried paper, so reeled, has been passed a second time between the forming-cylinder and the felt, and a second thickness of pulp or paper formed upon the first sheet. It was then passed again through the two successive pairs of squeeze-rollers, as before, and over the drying rolls or cylinders. The first sheet, in this case, being compacted and squeezed partially dry before the second was formed on it, the two sheets were imperfectly combined, and were liable to separate. The process was troublesome and tedious also.

Another method attempted was to use two wire-cloth forming-cylinders, and immediately after the pulp or paper has been formed onto the felt by the first of the cylinders, a second sheet of pulp or paper was formed upon the first sheet by the second forming-cylinder. This process required a single felt, the ordinary squeeze-rollers, and an additional forming-cylinder, turning in the same vat and in the same direction as the forming-cylinder. It answered very well for thin paper; but when the thickness of the paper was increased the expressing the water therefrom in the ordinary manner, between the squeeze-rolls, would crush the sheet, and thus destroy its uniformity of strength and texture in the same way as described above upon the ordinary cylinder process.

The nature of my improvement consists, first, in forming two or more distinct fabrics, and then pressing them together and removing a portion of the water between two endless felts in a continuous operation; and, secondly, my improvement also relates to the arrangement of two felts, upper and lower, between which the pulp is squeezed, so as to cause the water, or a portion thereof, to be squeezed up through and escape above and over the top of the upper felt. This part of my improvement is applicable to squeezing paper-pulp, however formed, in order to remove the water therefrom without crushing or destroying the texture of the same.

To enable others skilled in the art to make and use my improvement, I proceed to describe the construction, arrangement, and operation of the same.

In that part of my improved arrangement in which I form two or more distinct fabrics I employ two or more separate pulp-vats, A and B, or separate apartments of one vat. (See figure.) In each vat or apartment a forming-cylinder, of wire-cloth of the ordinary description, is placed. These are shown at C and D. Each cylinder is furnished with a separate and distinct endless felt or blanket. The cylinder C forms its pulp or paper onto the felt E in the direction of the arrow *a*, toward the squeeze-rollers F F′. The second forming-cylinder D rotates in the pulp-vat B, in the direction indicated by the arrow thereon, and forms a sheet of pulp on the endless felt or blanket H.

The second part of my apparatus relates to the squeezing of the pulp, whether formed as above or otherwise, and is as follows: The pulp or paper, when formed, passes upon the felt toward the squeeze-rollers F F′, as indicated by the arrows *h h*. Previously, however, to its reaching the squeeze-rollers, another felt, or its equivalent, is, by means of the guide-roll K, brought into contact with and on the upper side of the pulp. The lower felt may also pass over another guide-roller, K′.

The two endless felts, with the sheet of pulp between them, pass together between the squeeze-rollers F F′, and being together prior to contact of either felt with the squeeze-rolls, the water pressed out is thus allowed to pass through the upper felt and run off on top of the same in front of the rows, at either end of them. The effect of this arrangement, if two or more distinct fabrics be formed, is not only to express the water therefrom, but to effectually unite them together in one mass.

By pressing the pulp between two endless felts, so arranged as to allow the water to pass freely through them in front of the rolls, I protect it from crushing, and thus preserve its texture.

It will be seen that in the first part of my improvement I make use of a second forming-cylinder, and employ the second endless felt in connection therewith as a forming-felt. The advantage of this improved arrangement is, that paper of any desired thickness, and of proportionally increased strength, composed of two or more layers, may be formed at one operation; and the advantage of the second part of my improvement is, that a thick sheet of pulp can be squeezed between an upper and lower felt without crushing or destroying the texture of the mass.

Having thus described my invention, what I claim herein as new is—

1. Running or operating two or more forming-cylinders, in connection with the press-rolls, by means of or in combination with two endless felts, so arranged that the water passes through the felts and runs off at the end of the rolls.

2. Passing or carrying a sheet of paper-pulp through or between the press-rolls, and expressing the water therefrom between two endless felts, so arranged that the water may pass through the felts in front of the rolls and run off freely at the ends.

3. The combination of the two forming-cylinders C and D, the two endless felts E and H, the guide-roll K, and the two squeeze-rollers F F′, arranged and operating substantially as described.

SAMUEL G. LEVIS.

Witnesses:
WM. R. WRIGHT,
THOS. A. BURTT.